United States Patent [19]

John et al.

[11] Patent Number: 4,592,514

[45] Date of Patent: Jun. 3, 1986

[54] FIELD CHOPPER WITH ADJUSTABLE FAN ASSIST

[75] Inventors: Günter John; Karl-Heinz Kretschmer, both of Neustadt; Horst Schumacher, Langburkersdorf; Jürgen Röllich, Ehrenberg, all of German Democratic Rep.

[73] Assignee: VEB Kombinat Fortschritt-Landmaschinen, Neustadt, German Democratic Rep.

[21] Appl. No.: 629,679

[22] Filed: Jul. 11, 1984

[30] Foreign Application Priority Data

Jul. 11, 1983 [DD] German Democratic Rep. .................................. 2529387

[51] Int. Cl.⁴ ............................................. B02C 18/22
[52] U.S. Cl. .................................... 241/55; 241/222
[58] Field of Search ............ 241/222, 223, 224, 101.7, 241/55, 56, 57

[56] References Cited

U.S. PATENT DOCUMENTS

| | | | |
|---|---|---|---|
| 2,857,946 | 10/1958 | Nikkel | 241/55 |
| 3,342,230 | 9/1967 | Waldrop | 241/56 |
| 3,866,843 | 2/1975 | Lunn | 241/55 |

FOREIGN PATENT DOCUMENTS

| | | |
|---|---|---|
| 120420 | 11/1966 | Czechoslovakia . |
| 955370 | 1/1957 | Fed. Rep. of Germany . |
| 1986843 | 6/1968 | Fed. Rep. of Germany . |
| 2612692 | 10/1977 | Fed. Rep. of Germany . |

Primary Examiner—Mark Rosenbaum
Attorney, Agent, or Firm—Karl F. Ross; Herbert Dubno

[57] ABSTRACT

A chopper has a housing centered on an axis and having a radially open input and a radially open output spaced angularly therefrom as well as a pair of axially oppositely open intakes, and a cutter drum rotatable in the housing about the axis and having a pair of end plates transverse of the axis and having axially oppositely directed faces confronting the respective intakes and a plurality of blades secured to and between the end plates and having cutting edges defining on rotation of the drum an orbit centered on the axis. Respective pluralities of vanes at the end plates can be secured either to the respective end plates in in-service positions extending generally radially thereon so that rotation of the drum moves the vanes to draw air in the axial intakes and expel it through the radial output or in an out-of-service position in which they do not move appreciable air. The vanes can be secured in the out-of-service position also to the respective end plates but extending generally only angularly. In particular the vanes form a radially closed cylindrical annulus in the out-of-service position. This annulus generally blocks flow from the intake to the output in the out-of-service position. The vanes can also be secured in the out-of service position so as not to rotate with the drum.

8 Claims, 5 Drawing Figures

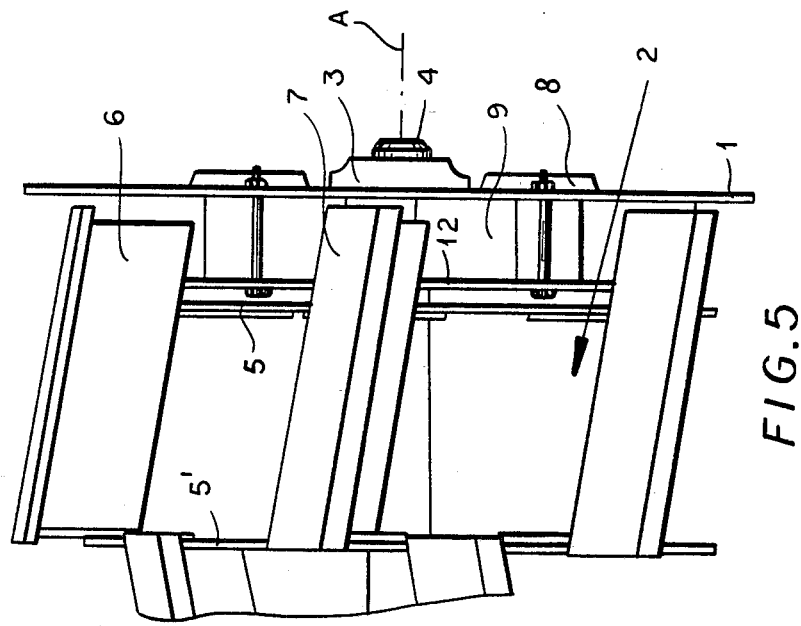
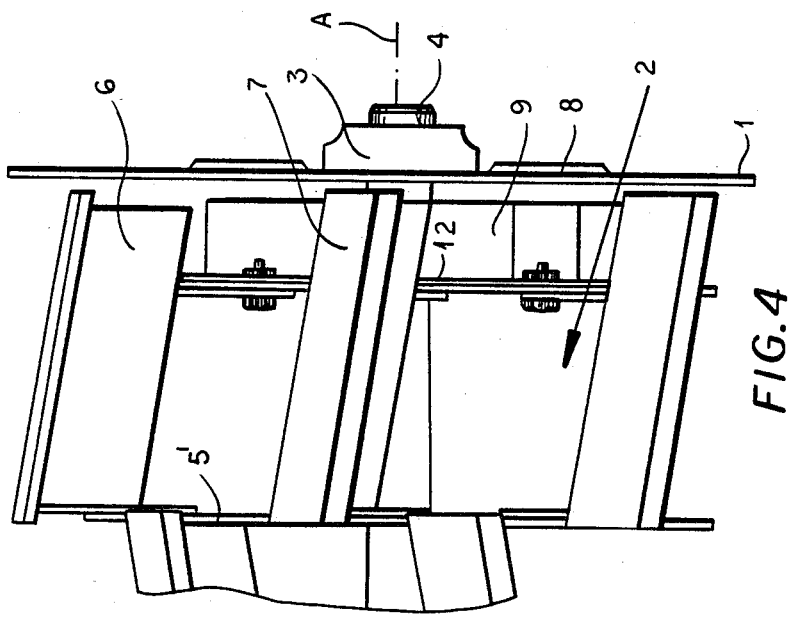

FIELD CHOPPER WITH ADJUSTABLE FAN ASSIST

FIELD OF THE INVENTION

The present invention relates to a chopper. More particularly this invention concerns a field chopper with air assist.

BACKGROUND OF THE INVENTION

A standard field chopper has a housing centered on an axis and having a radially open input and a radially open output spaced angularly therefrom. A cutter drum rotatable in the housing about the axis has a pair of end plates transverse of the axis and having axially oppositely, directed faces confronting the respective intakes and a plurality of blades secured to and between the end plates and having cutting edges defining on rotation of the drum an orbit centered on the axis. The material to be chopped—fresh or dry fodder, hay, corn, or the like—is fed into the input where it is chopped up by the rapidly rotating blades and expelled as pieces from the output.

Such an arrangement is relatively efficient when used with hard crop, such as bark chips or corn, but can jam up when used to chop and convey lighter material such as hay or limp crop.

Thus it has been suggested in German Pat. No. 955,370, German utility model 1,986,843, German patent document 2,612 092, and Czechoslovakian Pat. No. 120,420 to mount air vanes on the rotor which form a powerful air stream that enhances flow out of the housing. Such vanes are normally mounted on the end plates and the housing is formed with axially open air intakes confronting the vaned portions of the end plates Thus these vanes form an axial-input radial-output fan, making the chopper capable of handling and conveying difficult materials.

The problem is that choppers thus equipped are less efficient when dealing with heavier crop than those without vanes Nonetheless the vaned arrangement is usually selected so that the user can chop all types of materials, even though with some materials the efficiency is reduced

OBJECTS OF THE INVENTION

It is therefore an object of the present invention to provide an improved chopper.

Another object is the provision of such a chopper which overcomes the above-given disadvantages, that is which operates efficiently with all types of crops.

SUMMARY OF THE INVENTION

A chopper according to this invention has a housing centered on an axis and having a radially open input and a radially open output spaced angularly therefrom as well as a pair of axially oppositely open intakes, and a cutter drum rotatable in the housing about the axis and having a pair of end plates transverse of the axis and having axially oppositely directed faces confronting the respective intakes and a plurality of blades secured to and between the end plates and having cutting edges defining on rotation of the drum an orbit centered on the axis; Respective pluralities of vanes at the end plates can be secured either to the respective end plates in in-service positions extending generally radially thereon so that rotation of the drum moves the vanes to draw air in the axial intakes and expel it through the radial output or in an out-of-service position in which they do not move appreciable air.

According to another feature of this invention the vanes are arcuate and are, relative to the normal direction of rotation of the drum and in the in-service position, forwardly and outwardly arcuate. In addition in the in-service position the vanes have inner edges extending generally tangentially of an imaginary cylinder centered on the axis and outer edges extending generally radially from the axis.

Thus with the system of this invention the chopper can be switched between an air-assist mode with the vanes in service and an unassisted mode in which the blades are out of service. In fact some of the blades can be in one position and some in the other to vary the air assist in dependence on material being chopped.

This can be done according to this invention by securing the vanes in the out-of-service position also to the respective end plates but extending generally only angularly. The vanes form a radially closed cylindrical annulus in the out-of-service position. This annulus generally blocks flow from the intake to the output in the out-of-service position.

Each of the vanes according to this invention is pivoted on the respective end plate and is pivotally displaceable between the positions. A locking element on each of the vanes is engageable with the respective end plate to secure the respective vane in the positions. Furthermore each end plate is formed with respective pairs of holes at each vane and the locking element is engageable in one of the respective holes in the in-service position and in the other of the respective holes in the out-of-service position.

It is also possible according to this invention to fix the vanes stationarily, that is so as not to rotate with the drum, in the out-of-service position. To this end respective support plates carrying the vanes can be secured, typically by bolts, to the respective end plates in the in-service position and to the housing in the out-of-service position.

DESCRIPTION OF THE DRAWING

The above and other features and advantages will become more readily apparent from the following, reference being made to the accompanying drawing in which:

FIGS. 4 and 5 are partial axial sections showing another apparatus of this invention with its vanes respectively in the in-service and out-of-service positions.

SPECIFIC DESCRIPTION

Figure 1:
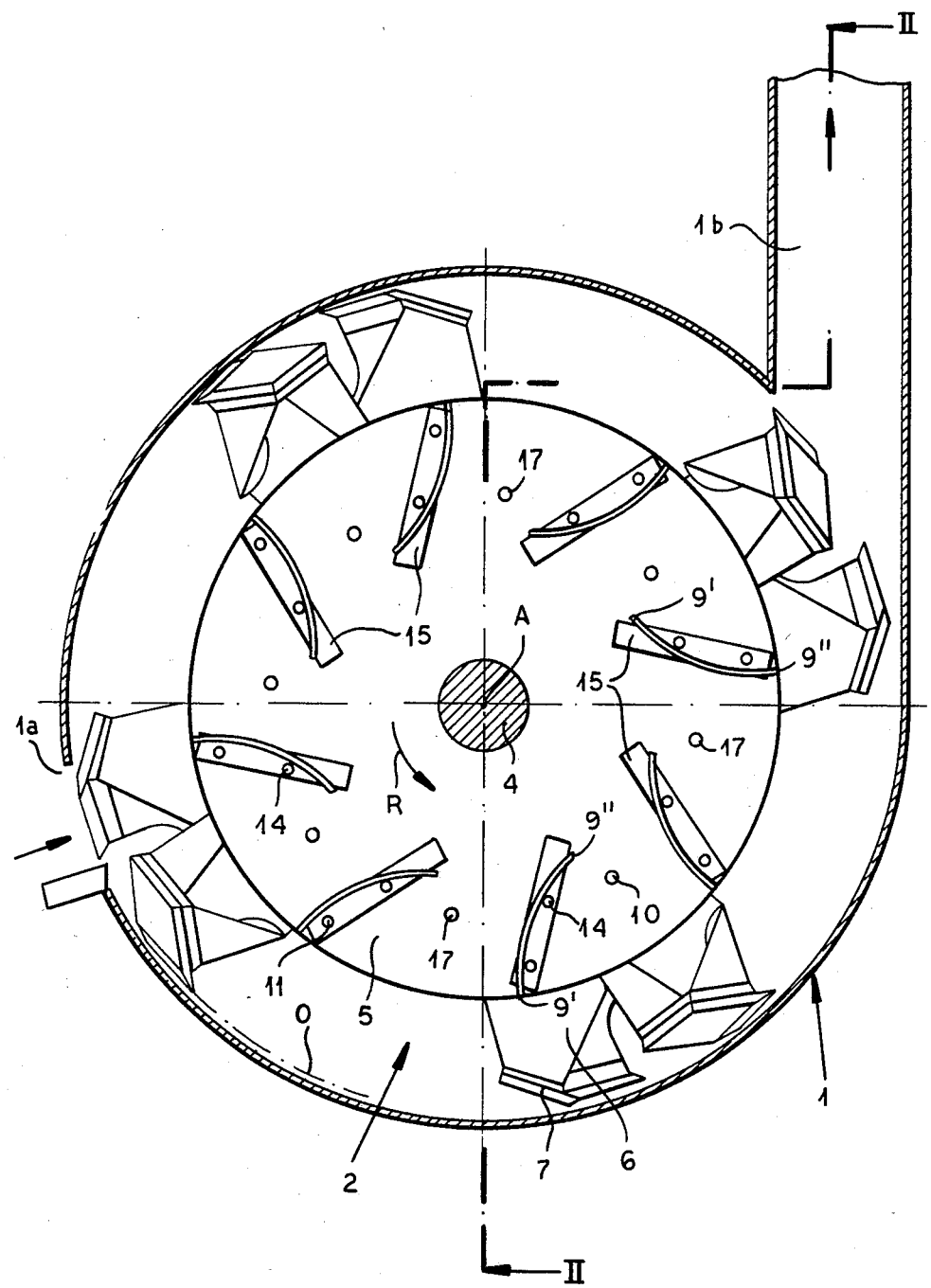
FIG. 1. is a vertical section through the chopper according to this invention.
Figure 2:
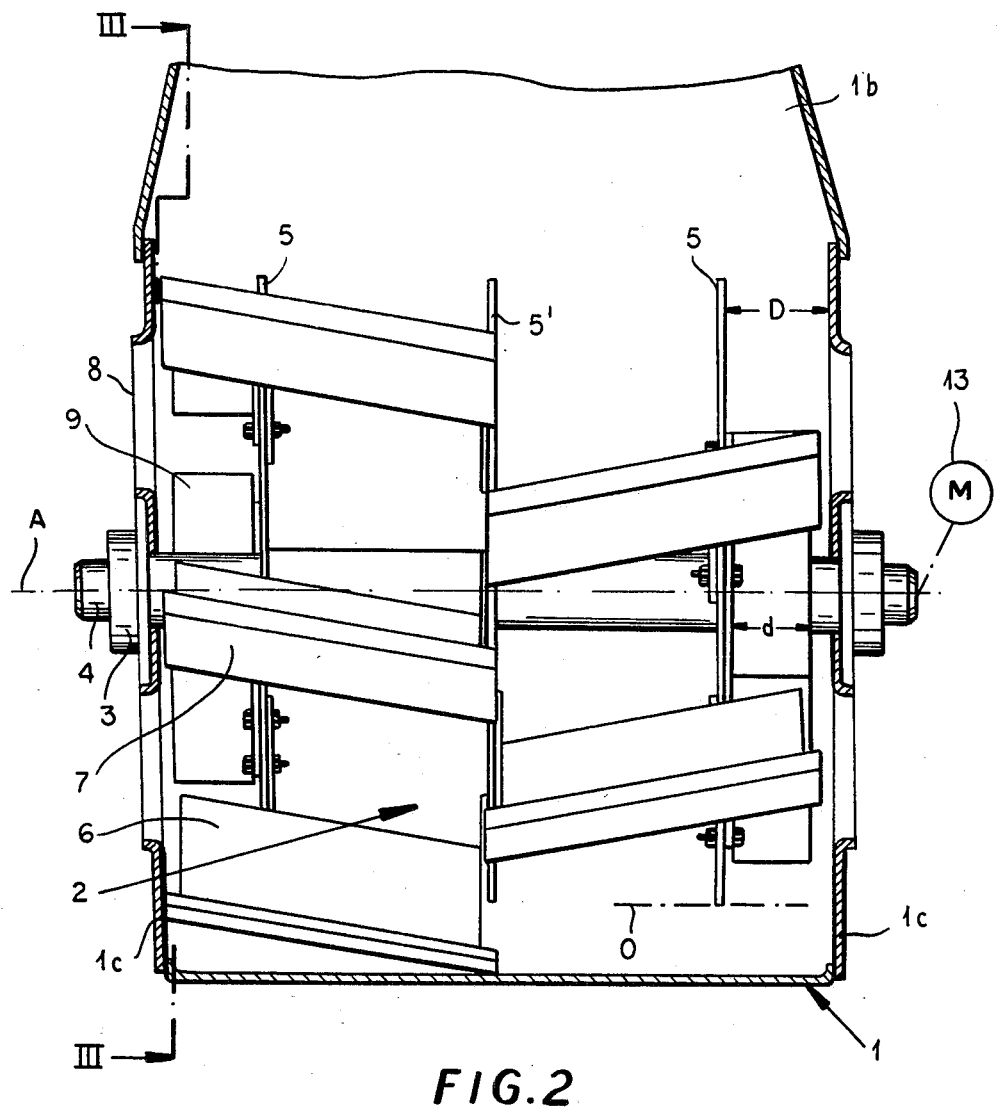
FIG. 2 is an axial section through the chopper taken along line II—II of FIG. 1.
Figure 3:
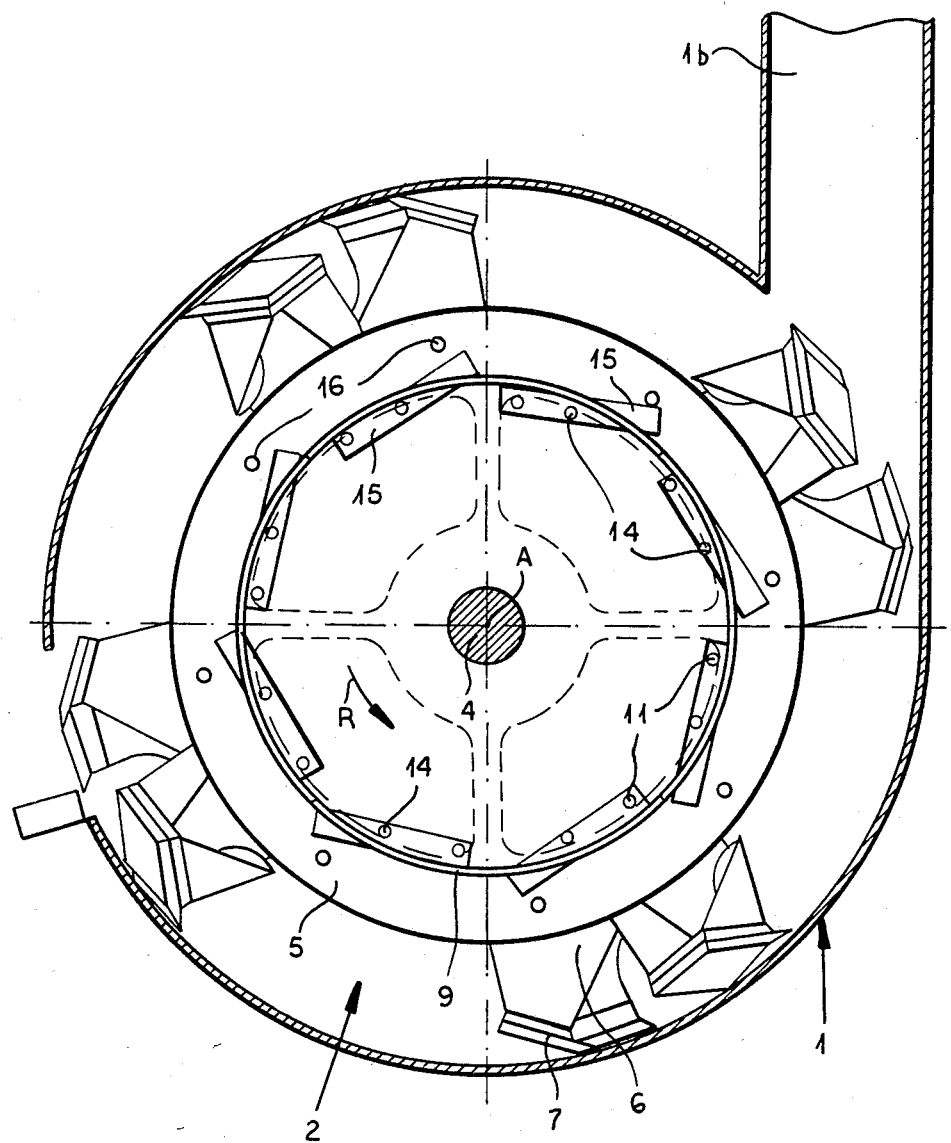
FIG. 3 is a section like FIG. 1 and taken along line III—III of FIG. 2, but showing the vanes in the out-of-service position.

As seen in FIGS. 1 through 3 a chopper according to this invention has a cylindrical housing 1 centered on a horizontal axis A and having on one side a horizontally and slightly downwardly directed input 1a and on the other side an upwardly directed output 1b. In addition this housing 1 has planar and circular end walls 1c lying in parallel planes perpendicular to the axis A.

Bearings 3 on these plates 1c support a shaft 4 for rotation about the axis A. This shaft 4 carries an inner blade plate or disk 5' and two outer blade plates 5 axially equidistantly flanking the disk 5' and lying in respective parallel planes perpendicular to the axis A but spaced inward of the respective end walls 1c by a distance D. These plates 5 and 5' carry two sets of blade beams 6 carrying respective blades 7 and forming therewith and with the shaft 4 a blade drum or rotor 2. The blades 7 extend generally axially, with their cutting edges lying on a cylindrical orbit 0 perfectly centered on the axis A and spaced slightly radially inward of the inner surface of the housing 1. This construction is generally standard.

The end walls 1c are formed with large axially throughgoing intake holes or ports 8 radially inward of the orbit 0 and equiangularly spaced around the axis A. These ports 8 have diameters somewhat greater than the distance D.

Thus in use the material to be chopped is fed into the input 1a while the drum 2 is rotated about the axis A at high speed, for instance by a motor illustrated schematically at 13 and in a counterclockwise direction R as seen in FIGS. 1 and 3. The material is chopped by the sharp leading edges of the blades 7 and propelled counterclockwise around inside the housing 11 by the rotating blades 7 and their beams 6 and upward and outward into the outlet 1b, leading to a silage chute or blower, for instance.

According to this invention the flow of the chopped material can be enhanced by providing eight part-cylindrically arcuate vanes 9 on the outside face of each of the end plates 5. These vanes 9 are identical, each formed as a family of parallel and adjacent lines parallel to the drum axis A, and each have a planar mounting flange 15 lying flatly against the outer face of the respective plate 5.

Each plate 5 is provided with eight pivots 14 equispaced radially from and angularly around the axis A and each formed by a rivet, stud, bolt, or the like. The pivots 14 are connected to the flanges 15 of the respective vane 9, identically engaged through them about one-third of the way in on each flange 15 from the radially inner edge 9' of the respective vane 9, as shown in FIG. 1. In the in-service position of FIGS. 1 and 2 the outer end of each flange 15 is secured by a respective bolt 11 through a respective outer hole 16 (FIG. 3 only) in the respective drum plate 5. These holes 16 are radially equispaced from and angularly equispaced about the axis A, each radially outward of and angularly behind the pivot 14 of the respective vane 9.

The vanes 9 are therefore positioned to be forwardly concave, with their inner edges 9' spaced about one-half of the distance from the orbit 0 to the axis A and their outer edges 9" trailing the inner edges and level with the outer edge of the respective plate 5, which edge is itself radially about one-quarter of the radial distance between A and 0. When rotated the effect is that of a standard axial-input radial-output blower, drawing air in at the axial ports 8 and expelling it tangentially at the output 1b. The currents of air created in this manner serve to propel the chopped chips along the output 1b, which is quite necessary when the material being chopped is, for instance, wet or soft.

If the material being chopped is relatively hard and of high surface density (surface-area:mass ratio) such additional blowing is, as mentioned above, unneeded and in fact moving extra air is just a waste of energy. Hence FIG. 3 shows us how the vanes 9 can be taken out of service.

The outer plates 5 are formed approximately angularly equidistant between and ahead of the pivots 14 with holes 17 which are at about the same radial spacing from the axis A as the pivots 14. These holes 17 are also the same spacing from the pivots 14 as are the respective holes 16. Thus it is possible as shown in FIG. 3 to withdraw each of the bolts 11 from the respective outer hole 16 and pivot the respective vane 9 around until the bolt 11 can be fitted into the respective inner hole 17. To this end the bolts 11 can be spring loaded into positions projecting from the respective flanges 15 through the respective plates 5, but movable against the spring force into positions pulled out of the respective plates 5.

In this position shown in FIG. 3 the edge 9' that hitherto was leading becomes the trailing edge and angularly abuts the edge 9" of the following vane 9, with all the vanes together forming a radially closed cylindrical annulus centered on the axis A. Thus the vanes 9 create no appreciable air flow, and in fact block the intake ports 8 to reduce air flow through the housing 1.

The changeover between modes of operation is extremely convenient and can be carried out in the field even by a relatively unskilled mechanic. In fact the changeover can be done completely without tools, or using very simple ones.

One side of the drum 2 or the other can be in the out-of-service mode of FIGS. 1 and 2 and the other side can be in service as shown in FIG. 3. It is also possible to pivot just some of the vanes from the position of the others to achieve a partial blowing effect. All such changes are equally easy to execute and experiment with.

It is also possible as shown in FIGS. 4 and 5 to fix the vanes 9 stationary, that is so as not to rotate with the drum, in the out-of-service position. To this end respective support plates carrying the vanes 9 can be secured as seen in FIG. 4 by bolts to the respective end plates 5 in the in-service position and to the housing 1 in the out-of-service position seen in FIG. 5.

We claim:

1. A chopper comprising:
   a housing centered on an axis and having a radially open input and a radially open output spaced angularly therefrom as well as a pair of axially oppositely open intakes;
   a cutter drum rotatable in the housing about the axis and having
      a pair of end plates transverse of the axis and having axially oppositely directed faces confronting the respective intakes, and
      a plurality of blades secured to and between the end plates and having cutting edges defining on rotation of the drum an orbit centered on the axis;
   respective pluralities of vanes at the end plates;
   means for securing the vanes to the respective end plates in in-service positions extending generally radially thereon so that rotation of the drum moves the vanes to draw air in the axial intakes and expel it through the radial output and for alternately securing the vanes in an out-of-service position also secured to the respective end plates but extending generally only angularly, whereby in the out-of-service position the vanes do not appreciably move air.

2. The chopper defined in claim 1 wherein the vanes are arcuate and, relative to the normal direction of rotation of the drum, are in the in-service position forwardly and outwardly arcuate and are in the out-of-service position radially inwardly concave.

3. The chopper defined in claim 2 wherein in the in-service position the vanes have inner edges extending generally tangentially of an imaginary cylinder centered on the axis and outer edges extending generally radially from the axis.

4. The chopper defined in claim 2 wherein the vanes form a radially closed cylindrical annulus in the out-of-service position.

5. The chopper defined in claim 4 wherein the annulus generally blocks flow from the intake to the output in the out-of-service position.

6. The chopper defined in claim 2 wherein each of the vanes is pivoted on the respective end plate and is pivotally displaceable between the positions.

7. The chopper defined in claim 6 wherein the means includes a locking element on each of the vanes engageable with the respective end plate to secure the respective vane in the positions.

8. The chopper defined in claim 7 wherein each end plate is formed with respective pairs of holes at each vane, the locking element being engageable in one of the respective holes in the in-service position and in the other of the respective holes in the out-of-service position.

* * * * *